United States Patent [19]

Peppel et al.

[11] Patent Number: 4,784,410
[45] Date of Patent: Nov. 15, 1988

[54] CONCENTRIC PIPING FLEX JOINT

[75] Inventors: George W. Peppel, Arlington; Paul E. Sullivan, Bedford, both of Tex.

[73] Assignee: Lockheed Corporation, Calabasas, Calif.

[21] Appl. No.: 9,255

[22] Filed: Jan. 30, 1987

[51] Int. Cl.⁴ .................................. F16L 39/00
[52] U.S. Cl. ........................ 285/133.2; 285/223; 285/263
[58] Field of Search ............... 285/223, 263, 133.2, 285/133.1

[56] References Cited

U.S. PATENT DOCUMENTS

| | | | |
|---|---|---|---|
| 3,680,895 | 8/1972 | Herbert et al. | 285/223 X |
| 4,068,864 | 1/1978 | Herbert et al. | 285/263 X |
| 4,068,868 | 1/1978 | Ohrt | 285/223 |
| 4,121,858 | 10/1978 | Schulz | 285/133.1 X |
| 4,121,861 | 10/1978 | Gorndt | 285/223 |
| 4,149,739 | 4/1979 | Morris | 285/133.1 |
| 4,173,360 | 11/1979 | Bergman et al. | 285/223 X |
| 4,416,473 | 11/1983 | Lamy et al. | 285/223 X |
| 4,515,399 | 5/1985 | Sullivan et al. | 285/263 X |
| 4,593,941 | 6/1986 | Whightsil, Sr. | 285/223 X |

FOREIGN PATENT DOCUMENTS 1276007 1/1961 France ................... 285/133.1

Primary Examiner—Thomas F. Callaghan
Attorney, Agent, or Firm—Eric R. Katz; Vangelis Economou

[57] ABSTRACT

Several versions of a flex joint (10, 100, 200) are disclosed which provides for relative flexible movement between a first member and a second member about a pivot point. The pivotal motion is provided by the use of elastomeric assemblies which are placed in elastomeric shear as one member pivots relative to the other. With each of the flex joints, at least two concentric and separate passages are formed through the flex joint for carrying fluids and the like through the flex joint. The passages remain separate and essentially unchanging in cross-section throughout the entire range of pivotal motion of the flex joint.

3 Claims, 3 Drawing Sheets

CONCENTRIC PIPING FLEX JOINT

TECHNICAL FIELD

This invention relates to a piping joint for use in flexibly connecting pipes for offshore use.

BACKGROUND OF THE INVENTION

In offshore drilling and production, there is often a need to provide piping extending from the sea floor to the surface where the drilling or production platform is positioned. This piping can act as a tension leg for supporting the platform, a conduit for drilling or production, a conduit for providing pressurized fluids for control functions to a sea floor unit from the platform, or any combination of these functions A critical consideration in such pipe construction is the movement of the platform relative to the sea floor. In the past, expensive flexible pipes have been rigidly mounted at the sea floor to extend to the platform to accommodate this motion. If mutiple fluid passages are necessary in such a pipe, concentric flexible pipes have been employed. However, as these flexible pipes move, the annular clearance between the pipes defining the passage varies.

A need exists for an improved technique for connecting sea floor equipment with a surface platform while providing for one or more passages through the pipe for communication between the platform and sea floor equipment.

SUMMARY OF THE INVENTION

In accordance with one aspect of the present invention, a flex joint is provided having first and second rigid pipe connectors. Structure, including elastomeric elements, connect the first and second rigid pipe connectors together and accommodates movement between the connectors relative to a pivot point by shear in the elastomeric elements.

In accordance with another aspect of the present invention, two passages are formed through the connectors.

In accordance with yet another aspect of the present invention, the elastomeric elements are formed of alternating layers of rigid material and elastomeric material, each layer of rigid material being a portion of a sphere and centered on a common pivot point.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

Figure 1:
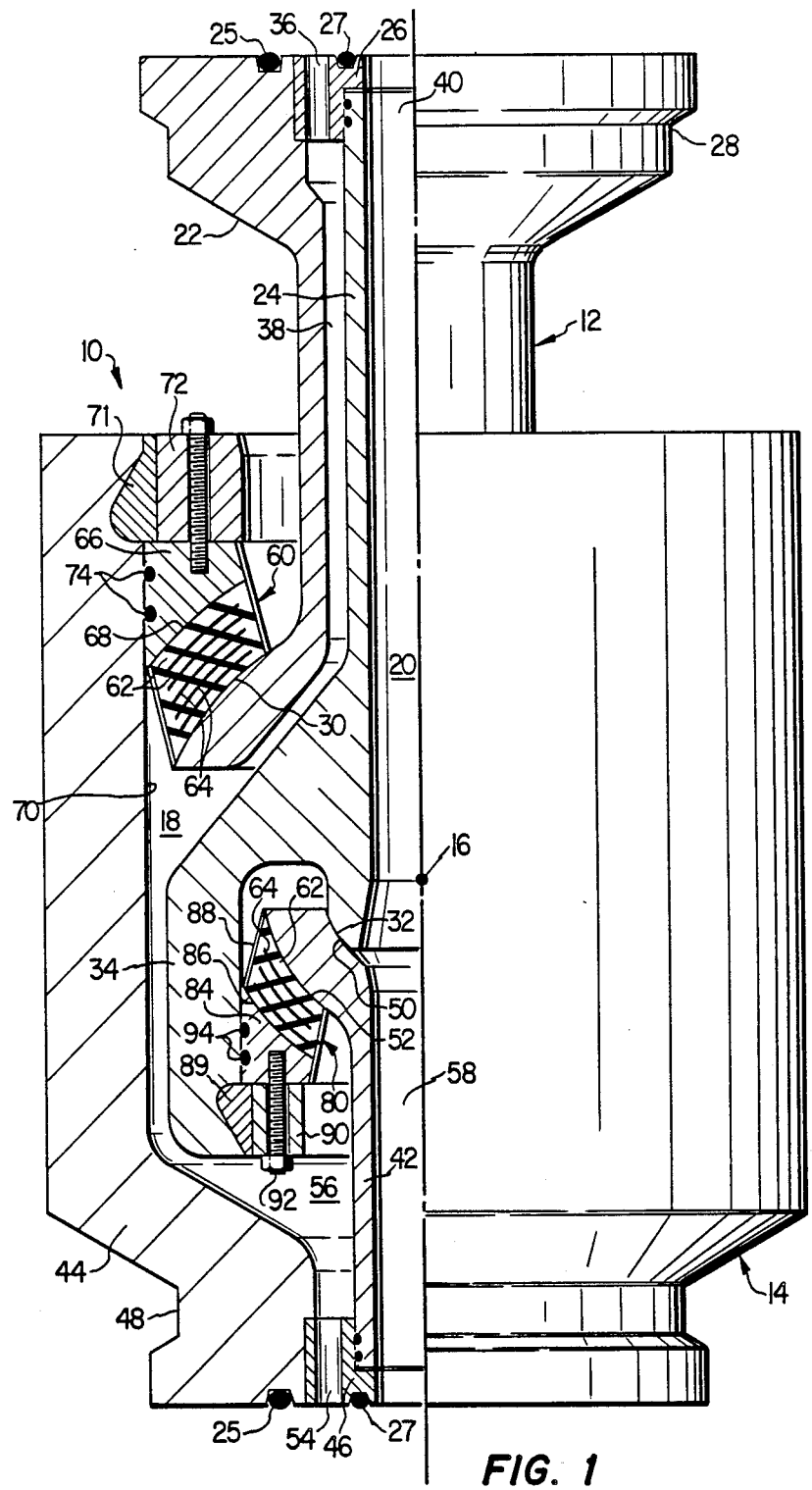
FIG. 1 is a partial cross-sectional view of a first embodiment of the present invention.

With reference now to the accompanying Drawings, wherein like reference numerals designate corresponding parts throughout the several views, FIG. 1 illustrates a flex joint 10 forming a first embodiment of the present invention. A first rigid pipe connector 12 and a second rigid pipe connector 14 are assembled together with a number of elastomeric assemblies to permit the connectors 12 and 14 to pivot relative each other about a pivot point 16. Two continuous passages, passage 18 and passage 20, are formed through the flex joint 10 and are maintained as separate passages by the construction of the flex joint as will be described in greater detail hereinafter. As the flex joint moves through its range of motion, these passages remain essentially uniform in cross-section and can be used to carry pressurized control fluids, etc.

The first rigid pipe connector 12 comprises an outer member 22, an inner member 24 and a connecting ring 26. The first rigid pipe connector 12 is designed for attachment to a rigid pipe leading to the platform at the surface, or, in the alternative, to sea floor mounted equipment. O-ring seals 25 and 27 seal between connector 12 and the pipe to maintain separation of passages 18 and 20.

The outer member 22 can be seen to have a clamping section 28 on its exposed end for clamping to an element (not shown) of the rigid pipe. Outer member 22 also defines a spherical bearing surface 30 on its inner end which is centered on the pivot point 16.

The inner member 24 defines a spherical surface 32 which is also centered on the pivot point 16. Inner member 24 also defines an arm 34 extending around surface 32.

The connecting ring 26 secures the outer member 22 and inner member 24 in a concentric orientation with their axis of symmetry coincident. Passage 36 through the connecting ring 26 opens into the annular passage 38 between the members 22 and 24 to define a portion of the continuous passage 18. The inner member 24 has a passage 40 which defines a portion of the continuous passage 20.

The second rigid pipe connector 14 is similarly constructed of an inner member 42 and an outer member 44 with a connecting ring 46 therebetween. The outer member 44 is configured for mounting to a rigid structure (not shown) by a clamp received in notch 48. The inner member 42 defines a spherical inner surface 50 and a spherical outer surface 52, both centered on the pivot point 16. In normal use of flex joint 10, the surfaces 50 and 32 will not be in contact. The connecting ring 46 is received between the inner and outer members to position them concentrically, with their axis of symmetry coincident. The connecting ring has a passage 54 formed therethrough which opens into an annular passage 56 between the inner and outer members. Passages 54 and 56 also form a portion of the continuous passage 18. The inner member 42 defines a passage 58 which forms a portion of the continuous passage 20. Seals 25 and 27 seal between the connector 14 and its mounting structure to maintain separation of passages 18 and 20.

An outer elastomeric assembly 60 is mounted between the outer member 22 and outer member 44, as shown in FIG. 1. Elastomeric assembly 60 performs a dual function. It acts as an elastomeric bearing between the members 22 and 44 and also acts as a pressure containing seal between passage 18 and the external environment. The elastomeric assembly 60 is formed of alternating layers of elastomeric material 62 and rigid plates 64. The rigid plates 64 are segments of spheres with their centers of curvature coincident with the pivot point 16. The inner side of assembly 60 is preferably bonded on the spherical surface 30 of the outer member 22. The outer surface of the assembly 60 is bonded to a ring 66 at spherical surface 68 on the ring. Ring 66 is retained within outer member 44 by a segmented retainer ring 71 held in place by a continuous ring 72 with ring 72 bolted to ring 66. Preferably, O-rings 74 seal between the ring 66 and the inner cylindrical surface 70.

An inner elastomeric assembly 80 is positioned between inner member 24 and inner member 42. As elastomeric assembly 60, elastomeric assembly 80 performs a dual function. It acts as an elastomeric bearing between the members 24 and 42, and also acts as a pressure containing seal between passages 18 and 20. Again, the inner elastomeric assembly 80 is formed of alternating layers of elastomeric material 62 and rigid plates 64. The rigid plates 64 are segments of spheres with their radii of curvature coinciding with pivot point 16. The inner face of the assembly 80 is preferably bonded to the spherical outer surface 52 of inner member 42. The outer face of elastomeric assembly 80 is bonded to a ring 84 at spherical surface 86 of the ring. Spherical surface 86 is concentric about pivot point 16 as well. The ring 84 is retained within the arm 34 by segmented retainer ring 89 held in place by continuous ring 90. Bolts 92 pass through the locking ring 90 to bolt the ring 84 thereto. O-rings 94 are provided between the outer surface of ring 84 and the inner cylindrical surface 88 to provide a seal.

As can be readily understood, the first and second rigid pipe connectors can pivot relative to each other about the pivot point 16 by placing the elastomeric assemblies 60 and 80 into shear. I addition, the configuration of the flex joint provides continuous passages 18 and 20 through the flex joint which do not vary significantly in cross section as the joint flexes.

Figure 2:
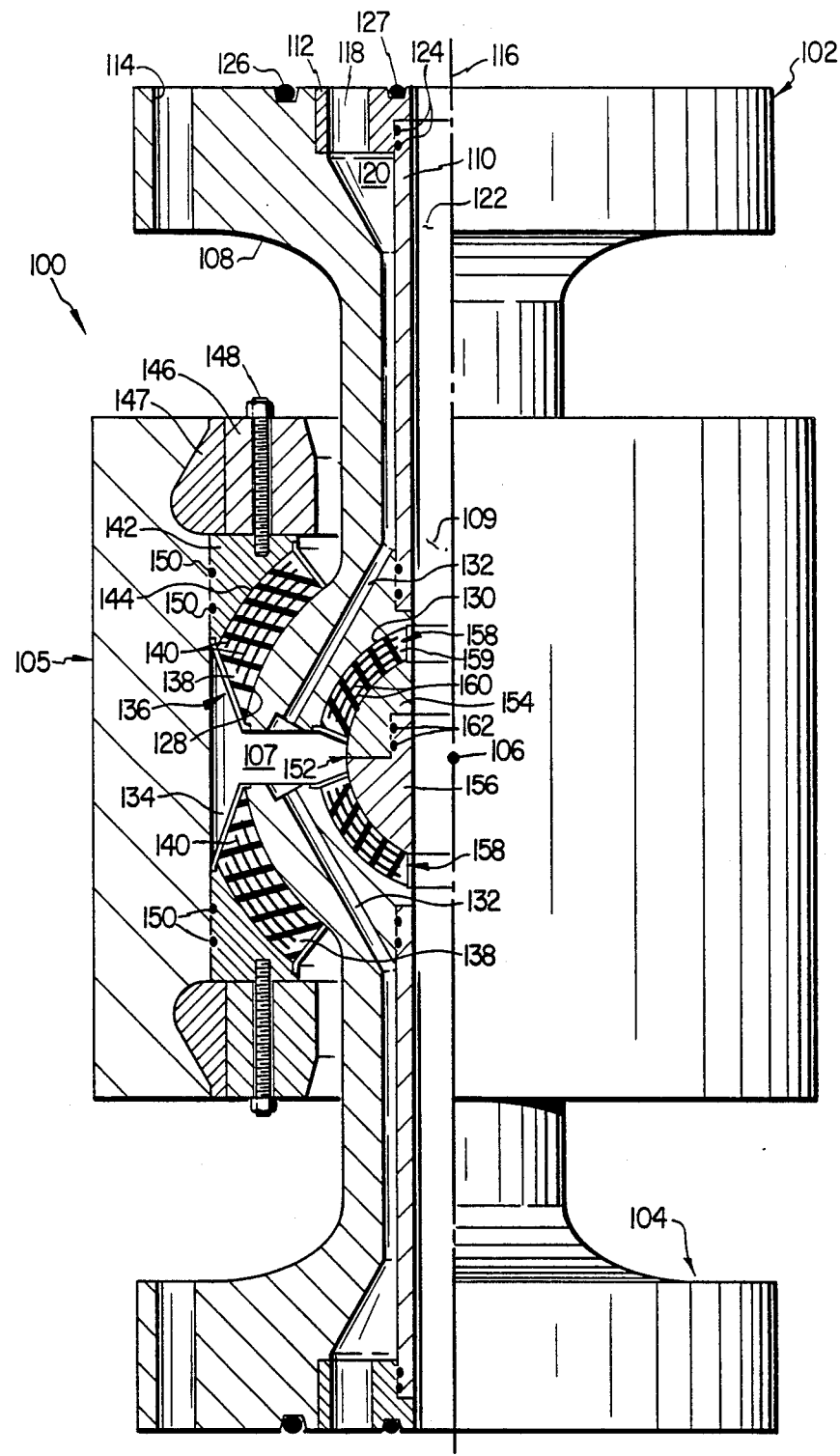
FIG. 2 is a partial cross-sectional view of a second embodiment of the present invention.

With reference now to FIG. 2, a second embodiment of the present invention is illustrated which forms a flex joint 100. The flex joint 100 includes a first rigid pipe connector 102, a second rigid pipe connector 104 and cylinder 105. The joint 100 provides for pivotal motion between the pipe connectors 102 and 104 about a pivot point 106 in a manner similar to flex joint 10. Continuous passages 107 and 109 are formed through the flex joint 100 for passage of fluids.

The first rigid pipe connector 102 is formed of an outer member 108, an inner member 110 and a connecting ring 112. As can be seen, outer member 108 has bolt holes 114 for bolting the connector 102 to piping or other equipment (not shown). The connecting ring 112 secures the inner and outer members concentric about their joint axis of symmetry 116. The connecting ring 112 has a passage 118 formed therethrough which opens into the annular passage 120 formed between the inner and outer members. Passages 118 and 120 each form a portion of continuous passage 107. The inner member itself defines a passage 122 therealong which forms a portion of passage 109. O-rings 124 seal between ring 112 and the inner member 110 to isolate the passage 120 from the passage 122. O-rings 126 and 127 on the exposed face of outer member 108 and ring 112 provide for sealing to the equipment to which the connector is secured and to maintain separation of passage 107 from passage 109.

The outer member 108 is provided with an outer spherical surface 128 and an inner spherical surface 130, each centered about the pivot point 106. A series of ports 132 pass through the outer member between the surfaces 128 and 130. The ports 132 are connected at one end to the annular passage 120 and open through the inner end of the outer member 108 within cavity 134.

An outer elastomeric assembly 136 is provided between the outer member 108 and cylinder 105. The elastomeric assembly 136 is formed of alternating layers of elastomeric material 138 and rigid plates 140. Each of the rigid plates 140 is a segment of a sphere with its center of curvature coincident with the pivot point 106. The inner surface of elastomeric assembly 136 is bonded to the outer spherical surface 128 of the outer member 108. The outer surface of the elastomeric assembly 136 is bonded to ring 142 at spherical surface 144 on the ring. The spherical surface 144 is similarly centered on the pivot point 106. The ring 142 is rigidly secured to the cylinder 105 by locking rings 46 and 147. Bolts 148 secure the ring to the locking ring 146. O-rings 150 provide for a fluid tight seal between the inner cylindrical surface of the cylinder 105 and the ring 142.

A spherical ball 152, formed of section 154 and section 156, is provided between the first and second pipe connectors 102 and 104. Inner elastomeric assembly 158 is bonded between section 154 and outer member 108. The inner elastomeric assembly 158 also comprises alternating layers of elastomeric material 159 and rigid plates 160. The rigid plates 160 are also segments of spheres with their centers of curvature coincident with the pivot joint 106. The outer surface of the inner elastomeric assembly 158 is bonded to the inner spherical surface 130 of outer member 108. The spherical ball 152 is formed in two sections so that the first and second connectors 102 and 104 can be separated. When sections 154 and 156 are interlocked, O-rings 162 provide a seal which isolates the continuous passage 107 from the continuous passage 109.

The second rigid pipe connector 104 is constructed essentially identical to the first rigid pipe connector 102. Preferably, the pipe connectors are interchangeable to reduce the cost of the flex joint.

As can be readily understood, the first and second rigid pipe connectors 102 and 104 can pivot relative to each other about the pivot point 106 by placing the elastomeric material in elastomeric assemblies 136 and 158 in shear. In addition, the continuous passages 107 and 109 remain separate and of generally uniform cross-section through the entire range of motion between the first and second pipe connectors.

Figure 3:
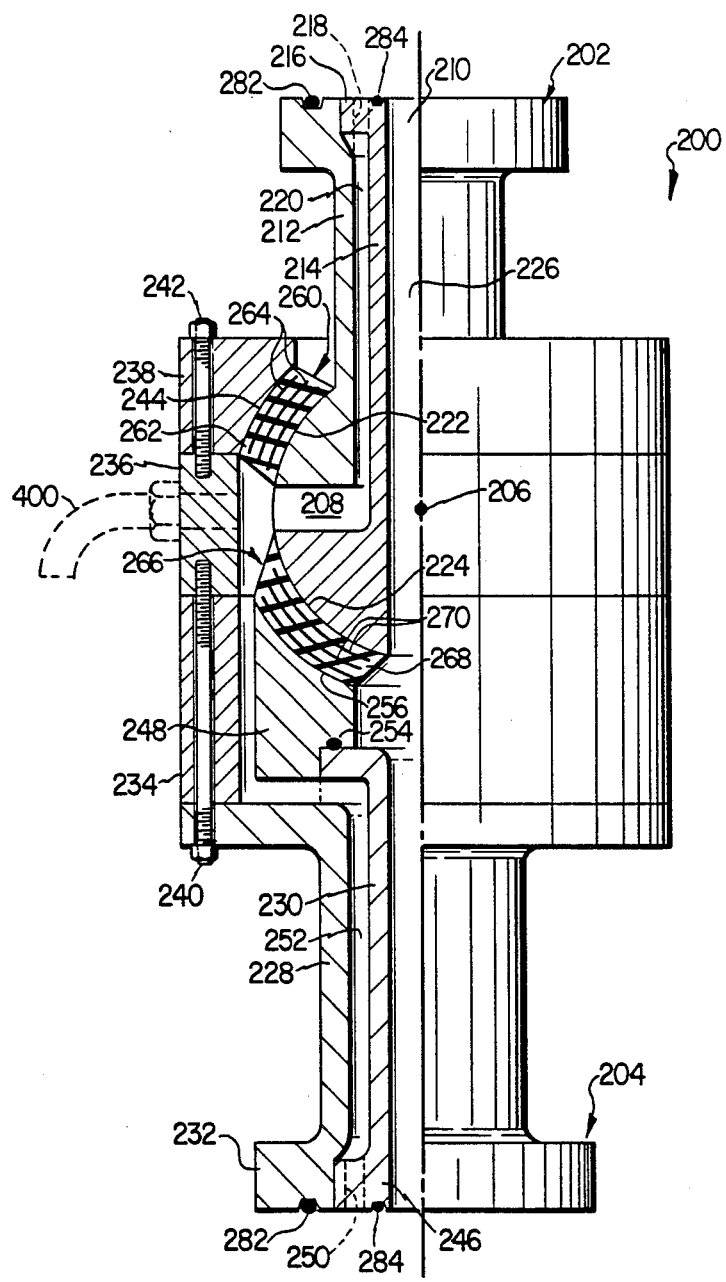
FIG. 3 is a partial cross-sectional view of a third embodiment of the present invention.

With reference now to FIG. 3, a third embodiment of the present invention is illustrated which forms a flex joint 200. The flex joint 200 is defined by a first flexible pipe connector 202 and a second flexible pipe connector 204 which are secured together by elastomeric material for pivotal motion relative to each other about a pivot point 206. A first continuous passage 208 and a second continuous passage 210 are formed through the flex joint 200 for carrying fluids and the like.

The first rigid pipe connector 202 is formed from an outer member 212 and an inner member 214. Inner member 214 is formed with an integral ring 216 which positions the members concentric with each other about their axis of symmetry. Ring 216 has a passage 218 therethrough which opens into the annular passage 220 formed between the members. Passages 218 and 220 form a portion of the continuous passage 208. Outer member 212 defines an outer spherical surface 222 and inner member 214 defines an outer spherical surface 224. A passage 226 formed through inner member 214 defines a portion of the continuous passage 210.

The second rigid pipe connector 204 includes an outer member 228 and an inner member 230. The outer member is formed of several sections, including sections 232, 234, and 236. If desired, sections 234 and 236 can be integral. In fact, sections 232, 234 and 236 can all be integral and passage 208 routed through a side outlet 400 as shown in dotted line, if desired. The sections can be assembled by the use of bolts 240. Sections 234 and 236 are essentially cylindrical sections. A section 238, which is integral with first elastomeric assembly 260, is removably secured to section 236 by bolts 242. Section 238 has an inner spherical surface 244 which is centered on the pivot point 206 and faces the outer spherical surface 222.

The section 232 is adapted for attachment to another pipe or element (not shown) at one end and has a radially outwardly extending section to which the remaining sections are bolted to provide sufficient room to receive portions of the first rigid pipe connector 202 within the interior of the outer member 228. O-ring seals 282 and 284 provide for sealing engagement with the other pipe or element to maintain separate passages 218 and 220.

The inner member 230 is formed of two sections 246 and 248. Section 246 is slidably received within a portion of section 232 to maintain both members concentric about their axis of symmetry. Section 246 has passages 250 formed therethrough which open into the annular passage 252 between members 228 and 230. Passages 250 and annular passage 252 form a portion of the continuous passage 208. Section 248 mates with section 246 as shown and an O-ring 254 is employed to seal the joint. The section 248 is provided with an inner spherical surface 256 which is centered on pivot point 206 and faces the outer spherical surface 224.

A first elastomeric assembly 260 is bonded between surfaces 244 and 222. The elastomeric assembly is constructed of alternating layers of elastomeric material 262 and rigid plates 264 with their center of curvature on the pivot point 206. A second elastomeric assembly 266 is similarly bonded between surface 224 and surface 256. Assembly 266 also is constructed of alternating layers of elastomeric material 268 and rigid plates 270. As true with previous elastomeric assemblies described, assemblies 260 and 266 perform the dual function of seals and bearings.

As can be seen, the flex joint 200 will permit relative pivotal motion between the rigid pipe connectors 202 and 204 about the pivot point 206 by inducing shear forces in the elastomeric material 262. For the entire range of relative pivotal motion, the passages 208 and 210 remain essentially unrestricted in cross-section. Seals 282 and 284 at the ends of the pipe connectors 202 and 204 provide for sealing against the structures mounting the joint 200 and maintain the separation of passages 250 and 252.

As can be seen, the flex joints described above provide for two continuous separate concentric fluid passages through the flex joint. These passages can be pressurized with fluid of any desired type. By using the flex joint as described above, a rigid pipe can be mounted to one connector and the other connector connected to the sea bed equipment. The pivotal motion allowed between the two connectors will provide the necessary freedom of motion between the sea floor and the surface platform without requiring the use of flexible pipe extending from the sea floor to the platform. Flex joints as disclosed in this detailed description can be expected to carry fluids within the passages at pressures as high as 10,000 psi.

Although the present invention has been described with respect to several embodiments thereof, various changes and modifications may be suggested to one skilled in the art, and it is intended that the present invention encompass such changes and modifications as fall within the scope of the appended claims.

We claim:

1. A flex joint for connecting a first pipe and a second pipe for relative pivotal motion about a pivot point and for transferring both tension and compressive forces between the first and second pipes, said flex joint comprising:
   (a) a first rigid pipe connector including a first inner member and a first outer member, said first inner and outer members being concentrically located and spaced to form a first outer passage, said first inner member having a central opening to form a first inner passage, said first inner and outer passages extending through said first rigid pipe connector;
   (b) a second rigid pipe connector including a second inner member and a second outer member, said second inner and outer members being concentrically located and spaced to form a second outer passage and said second inner member having a central opening to form a second inner passage, said second inner and outer passages extending through said second rigid pipe connector;
   (c) said second outer member having a substantially cylindrical body with an open end and a constricted end;
   (d) sections of both said first inner and outer members of said first rigid pipe connector extending within the interior of said cylindrical body of said second outer member from said open end of said cylindrical body, said second of said first inner member extending into said cylindrical body having an end with a C-shaped cross-section;
   (e) a first inner spherical surface positioned near said open end of said cylindrical body of said second outer member;
   (f) a first outer spherical surface positioned near that end of said first outer member extending within said cylindrical body of said second outer member of said second rigid pipe connector;
   (g) a first elastomeric bearing assembly bonded between said first inner and said first outer spherical surfaces;
   (h) one end of said second inner member extending into the open end of said C-shaped cross-section of said first inner member;
   (j) a second outer spherical surface positioned near that end of said second inner member extending into the C-shaped cross-section of said first inner member;
   (j) a second inner spherical surface position within the C-shaped cross-section of said first inner member;
   (k) a second elastomeric bearing assembly bonded between said second inner and second outer spherical surfaces; and
   (l) each of said spherical surfaces being centered on the pivot point of said flex joint.

2. The flex joint of claim 1, wherein each of said elastomeric bearing assemblies is deformable in shear.

3. The flex joint of claim 2, wherein each of said elastomeric bearing assemblies is formed of alternating layers of elastomeric material and rigid plates, each of said rigid plates forming a spherical segment centered on the pivot point of said flex joint.

* * * * *